(12) United States Patent
Lin et al.

(10) Patent No.: US 10,061,426 B2
(45) Date of Patent: Aug. 28, 2018

(54) SELF-CAPACITIVE TOUCH DISPLAY PANEL AND DRIVING METHOD THEREOF

(71) Applicant: Raydium Semiconductor Corporation, Hsinchu (TW)

(72) Inventors: Kun-Tsung Lin, Taichung (TW); Chih-Hsiung Chen, New Taipei (TW); Chih Yuan, New Taipei (TW)

(73) Assignee: Raydium Semiconductor Corporation, Hsinchu (TW)

( * ) Notice: Subject to any disclaimer, the term of this patent is extended or adjusted under 35 U.S.C. 154(b) by 141 days.

(21) Appl. No.: 15/170,471

(22) Filed: Jun. 1, 2016

(65) Prior Publication Data

US 2016/0357322 A1 Dec. 8, 2016

Related U.S. Application Data

(60) Provisional application No. 62/170,778, filed on Jun. 4, 2015.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ...... G06F 3/0416; G06F 3/0412; G06F 3/044; G06F 3/0418
See application file for complete search history.

(56) References Cited

U.S. PATENT DOCUMENTS

| | | | | |
|---|---|---|---|---|
| 2006/0097991 | A1* | 5/2006 | Hotelling | G06F 3/0416 345/173 |
| 2014/0375609 | A1* | 12/2014 | Kim | G06F 3/0418 345/174 |
| 2015/0009170 | A1* | 1/2015 | Chen | G06F 3/044 345/174 |
| 2016/0224147 | A1* | 8/2016 | Ding | G06F 3/0412 |
| 2016/0283023 | A1* | 9/2016 | Shin | G06F 3/044 |

* cited by examiner

*Primary Examiner* — Richard Hong
(74) *Attorney, Agent, or Firm* — Patterson + Sheridan, LLP

(57) ABSTRACT

A self-capacitive touch display panel includes a resistor, a first capacitor, a second capacitor, a third capacitor, a common electrode, a display driving source, and a touch sensing circuit. The first capacitor is coupled between a first terminal of the resistor and a ground terminal. The second capacitor and the third capacitor are coupled in series between the first terminal of the resistor and the ground terminal. The common electrode is coupled to a second terminal of the resistor. The display driving source is coupled between the second capacitor and the third capacitor. The touch sensing circuit is coupled to the common electrode and used to sense a touch capacitance via the common electrode when touch sensing. A first driving voltage of the display driving source is larger than a second driving voltage of the common electrode, so that the touch capacitance sensed by the touch sensing circuit is smaller than the capacitance of the first capacitor.

10 Claims, 4 Drawing Sheets

SELF-CAPACITIVE TOUCH DISPLAY PANEL AND DRIVING METHOD THEREOF

BACKGROUND OF THE INVENTION

Field of the Invention

This invention relates to driving a display apparatus, especially to a self-capacitive touch display panel and a method of driving a self-capacitive touch display panel.

Description of the Related Art

In general, an in-cell self-capacitive touch panel or a touch and display integrated self-capacitive touch panel can be applied to all kinds of portable electronic devices, such as a smart phone, a tablet PC and a notebook. Especially, the in-cell touch panel can achieve the thinnest touch panel design. The structures of the in-cell self-capacitive touch panel or the touch and display integrated self-capacitive touch panel are shown in FIG. 1. As shown in FIG. 1, the common electrodes VCOM of the self-capacitive touch panel 1 are all coupled to the touch and display integrated driving chip 10.

The conventional touch sensing methods of the in-cell self-capacitive touch panel are described as follows.

(1) The first conventional touch sensing method: Please refer to FIG. 2. As shown in FIG. 2, VCOM is the common electrode of the self-capacitive touch panel and SC is the display driving source of the self-capacitive touch panel. When the self-capacitive touch panel performs touch sensing, the touch sensing circuit of the self-capacitive touch panel will sense a touch sensing capacitance through the common electrode VCOM. Because the display driving source SC shown in FIG. 2 maintains at a fixed voltage level VF, the touch sensing capacitance sensed by the touch sensing circuit of the self-capacitive touch panel should be the total of the first capacitance C1 and the second capacitance C2. The current I generated by the common electrode VCOM will flow toward the first capacitance C1 and the second capacitance C2 respectively.

It should be noticed that since this touch sensing capacitance is very large, it will increase the touch sensing time of the self-capacitive touch panel, so that the display driving time of the self-capacitive touch panel will become shorter and the touch sensing performance will also become poorer.

(2) The second conventional touch sensing method: Please refer to FIG. 3. As shown in FIG. 3, the display driving source SC maintains high output impedance; therefore, the touch sensing capacitance sensed by the touch sensing circuit of the self-capacitive touch panel should be the total of the first capacitance C1 and the equivalent capacitance of the second capacitance C2 and the third capacitance C3 coupled in series. The current I generated by the common electrode VCOM will flow toward the first capacitance C1 and the second capacitance C2 respectively.

Although the touch sensing capacitance sensed by the second conventional touch sensing method is smaller than the touch sensing capacitance sensed by the first conventional touch sensing method, the touch sensing time of the self-capacitive touch panel is still too long, so that the display driving time of the self-capacitive touch panel is still too short and the touch sensing performance is still poor.

SUMMARY OF THE INVENTION

Therefore, the invention provides a self-capacitive touch display panel and a self-capacitive touch display panel driving method to solve the above-mentioned problems.

An embodiment of the invention is a self-capacitive touch display panel. In this embodiment, the self-capacitive touch display panel includes a resistor, a first capacitor, a second capacitor, a third capacitor, a common electrode, a display driving source and a touch sensing circuit. The first capacitor is coupled between a first terminal of the resistor and a ground terminal. The second capacitor and the third capacitor are coupled between the first terminal of the resistor and the ground terminal in series. The common electrode is coupled to a second terminal of the resistor. The display driving source is coupled between the second capacitor and the third capacitor. The touch sensing circuit is coupled to the common electrode and used for sensing a touch capacitance via the common electrode during a touch sensing period. A first driving voltage of the display driving source is larger than a second driving voltage of the common electrode, so that the touch capacitance sensed by the touch sensing circuit is smaller than a capacitance of the first capacitor.

In an embodiment, the first driving voltage of the display driving source forms a first current and the second driving voltage of the common electrode forms a second current.

In an embodiment, the first current flows to the first capacitor and the second current flows to the first capacitor through the resistor.

In an embodiment, the first current and the second current both flow through the first capacitor, so that a parasitic capacitance sensed by the touch sensing circuit is decreased and the touch capacitance sensed by the touch sensing circuit is smaller than the capacitance of the first capacitor.

In an embodiment, the common electrode senses the touch capacitance through a sensing pad.

In an embodiment, the self-capacitive touch display panel is an in-cell self-capacitive touch display panel or a hybrid self-capacitive touch display panel.

In an embodiment, the self-capacitive touch display panel further includes a display driving gate coupled to the display driving source, wherein a third driving voltage of the display driving gate is larger than the second driving voltage of the common electrode.

In an embodiment, the self-capacitive touch display panel further includes a touch and display integrated chip coupled to the common electrode.

In an embodiment, a touch sensing time that the touch sensing circuit performs touch sensing is decreased, so that a display driving time of the display driving source becomes longer.

Another embodiment of the invention is a self-capacitive touch display panel driving method for driving a self-capacitive touch display panel. The self-capacitive touch display panel includes a resistor, a first capacitor, a second capacitor, a third capacitor, a common electrode, a display driving source and a touch sensing circuit. The first capacitor is coupled between a first terminal of the resistor and a ground terminal. The second capacitor and the third capacitor are coupled between the first terminal of the resistor and the ground terminal in series. The common electrode is coupled to a second terminal of the resistor. The display driving source is coupled between the second capacitor and the third capacitor. The touch sensing circuit is coupled to the common electrode. The self-capacitive touch display panel driving method includes: during a touch sensing period, the touch sensing circuit sensing a touch capacitance via the common electrode; wherein a first driving voltage of the display driving source is larger than a second driving voltage of the common electrode, so that the touch capacitance sensed by the touch sensing circuit is smaller than a capacitance of the first capacitor.

Compared to the prior art, the self-capacitive touch display panel and the self-capacitive touch display panel driving method of the invention provide a novel way to drive the in-cell self-capacitive touch display panel, so that the display driving and touch sensing of the in-cell self-capacitive touch display panel can be well cooperated to effectively reduce the touch sensing time and the sensed parasitic capacitance. The self-capacitive touch display panel and the self-capacitive touch display panel driving method of the invention have the following advantages:

(1) More panel capacitances can be loaded.
(2) The touch sensing time of the panel can be decreased.
(3) The display driving time of the panel can be increased.
(4) Better touch sensing performance can be achieved.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A preferred embodiment of the invention is a self-capacitive touch display panel. In this embodiment, the self-capacitive touch display panel can be an in-cell self-capacitive touch panel or a hybrid self-capacitive touch panel used in various kinds of portable electronic devices, such as smart phones, tablet PCs, notebook PCs, but not limited to this.

Figure 4:
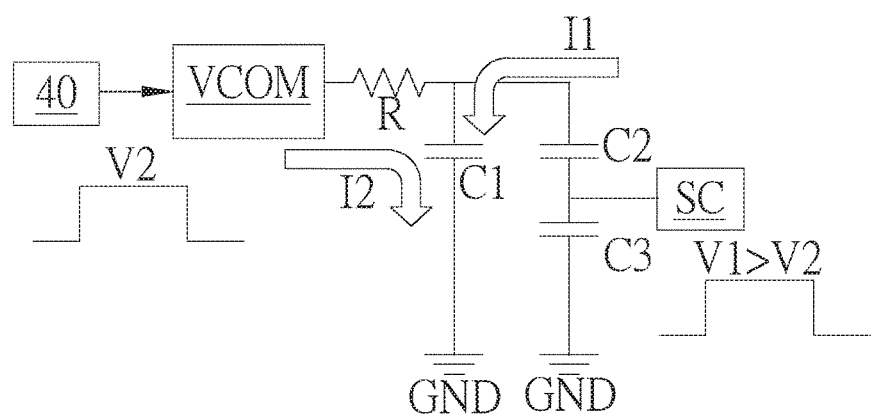
FIG. 4 illustrates a schematic diagram of the touch sensing circuit of the self-capacitive touch panel sensing touch capacitances through the common electrode when the driving voltage of the display driving source is larger than the driving voltage of the common electrode in a preferred embodiment of the invention.

Please refer to FIG. 4. FIG. 4 illustrates a schematic diagram of the touch sensing circuit of the self-capacitive touch panel sensing touch capacitances through the common electrode when the driving voltage of the display driving source is larger than the driving voltage of the common electrode in a preferred embodiment of the invention.

Figure 1:
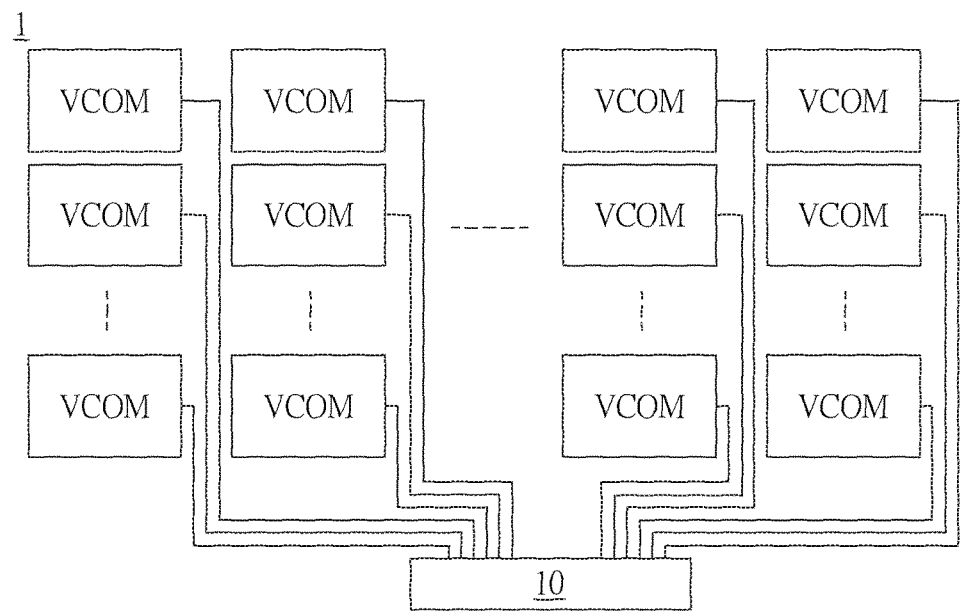
FIG. 1 illustrates the structures of the in-cell self-capacitive touch panel and the touch and display integrated self-capacitive touch display panel.
Figure 2:
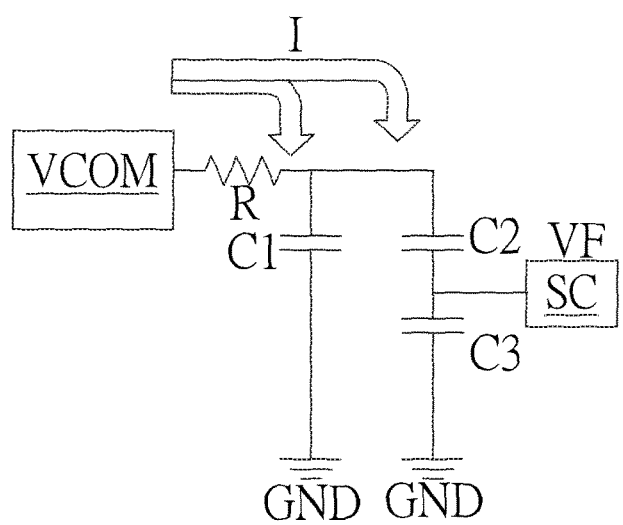
FIG. 2 illustrates a schematic diagram of the touch sensing circuit of the self-capacitive touch panel sensing touch capacitances through the common electrode when the display driving source is maintained at a fixed voltage level.
Figure 3:
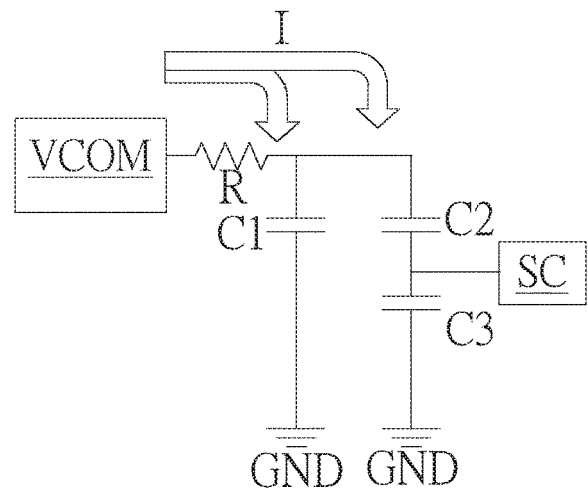
FIG. 3 illustrates a schematic diagram of the touch sensing circuit of the self-capacitive touch panel sensing touch capacitances through the common electrode when the display driving source is maintained at high output impedance.

As shown in FIG. 4, the self-capacitive touch display panel 4 includes a resistor R, a first capacitor C1, a second capacitor C2, a third capacitor C3, a common electrode VCOM, a display driving source SC and a touch sensing circuit 40. In fact, the self-capacitive touch display panel 4 can include a touch and display integrated chip coupled to a plurality of common electrodes VCOM respectively as shown in FIG. 1, but not limited to this.

In this embodiment, the first capacitor C1 is coupled between a first terminal of the resistor R and a ground terminal GND. The second capacitor C2 and the third capacitor C3 are coupled between the first terminal of the resistor R and the ground terminal GND in series. The common electrode VCOM is coupled to a second terminal of the resistor R. The display driving source SC is coupled between the second capacitor C2 and the third capacitor C3. The touch sensing circuit 40 is coupled to the common electrode VCOM.

It should be noticed that a first driving voltage V1 of the display driving source SC is larger than a second driving voltage V2 of the common electrode VCOM. The first driving voltage V1 of the display driving source SC forms a first current I1 and the second driving voltage V2 of the common electrode VCOM forms a second current I2. The first current I1 flows to the first capacitor C1 and the second current I2 flows to the first capacitor C1 through the resistor R.

When the touch sensing circuit 40 performs touch sensing, the touch sensing circuit 40 will sense a touch capacitance through the common electrode VCOM. Since the first driving voltage V1 of the display driving source SC is larger than the second driving voltage V2 of the common electrode VCOM, the first current I1 and the second current I2 will both flow through the first capacitor C1, so that the parasitic capacitance sensed by the common electrode VCOM when the touch sensing circuit 40 performs touch sensing will be reduced. Therefore, the touch capacitance sensed by the touch sensing circuit 40 will be far smaller than the capacitance of the first capacitor C1.

In practical applications, the common electrode VCOM senses the touch capacitance through a sensing pad, but not limited to this.

It should be noticed that the self-capacitive touch display panel 4 further includes a display driving gate GL. The display driving gate GL is coupled to the display driving source SC. The third driving voltage V3 of the display driving gate GL will be larger than the second driving voltage V2 of the common electrode VCOM.

Figure 5:
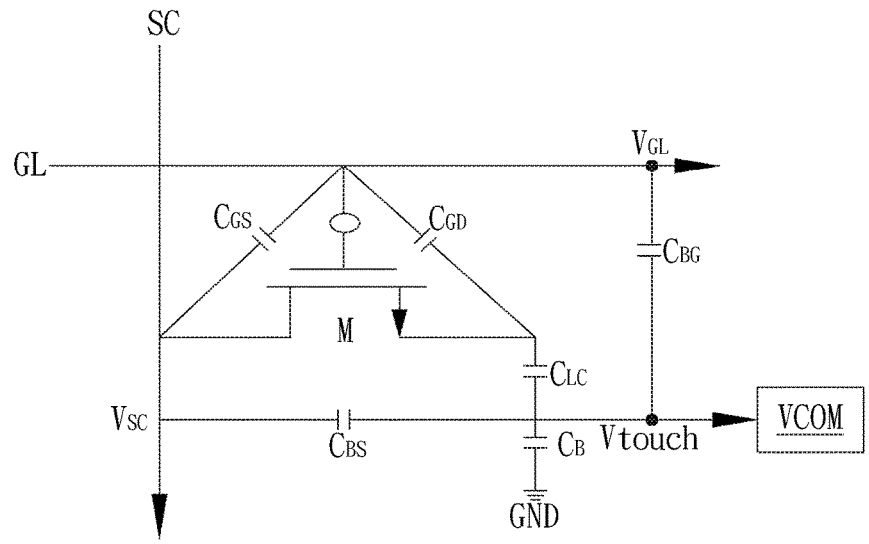
FIG. 5 illustrates a circuit schematic diagram of effectively reducing charge transfer by increasing the driving voltages of the display driving source and the display driving gate.

Please refer to FIG. 5. FIG. 5 illustrates a circuit schematic diagram of effectively reducing charge transfer by increasing the driving voltages of the display driving source SC and the display driving gate GL. As shown in FIG. 5, there is a parasitic capacitance $C_{GS}$ between the source and gate of the transistor M; there is a parasitic capacitance $C_{GD}$ between the drain and gate of the transistor M; there is a parasitic capacitance $C_{BG}$ between the common electrode VCOM and the gate of the transistor M; there is a parasitic capacitance $C_{BS}$ between the common electrode VCOM and the source of the transistor M; there is a parasitic capacitance $C_{LC}$ between the common electrode VCOM and the drain of the transistor M; there is a parasitic capacitance $C_B$ between the common electrode VCOM and the ground terminal GND.

In this embodiment, the charge transfer can be effectively reduced by increasing the driving voltages of the display driving source SC and the display driving gate GL. Then, the circuit of FIG. 5 will be used to perform theoretical derivation as follows.

Under a first touch sensing phase, it is assumed that the driving voltage of the display driving source SC is $V_S$, the driving voltage of the display driving gate GL is $V_{GL}$ and the touch sensing voltage $V_{touch}$ is grounded. The drain voltage $V_D$ and the touch sensing charge $Q_{touch}$ of the first touch sensing phase will be:

$$V_D = V_S - VCOM * \frac{C_{LC}}{C_{LC} + C_{GD}}$$

$$Q_{touch} = 0 * C_B + (0 - V_S) * C_{BS} + \left(VCOM * \frac{C_{LC}}{C_{LC} + C_{GD}} - V_S\right) * C_{LC} + (-V_{GL}) * C_{BG}$$

Under a second touch sensing phase, it is assumed that the driving voltage of the display driving source SC is $V_S+V_1$, the driving voltage of the display driving gate GL is $V_{GL}+V_2$ and the touch sensing voltage $V_{touch}$ is a reference voltage $V_{REF}$. The drain voltage $V_D$ and the touch sensing charge $Q_{touch}$ of the second touch sensing phase will be:

$$V_D = V_S + (V_{REF} - VCOM) * \frac{C_{LC}}{C_{LC} + C_{GD}}$$

$$Q_{touch} = V_{REF} * C_B + (V_{REF} - V_S - V_1) * C_{BS} + \left(\frac{V_{REF}C_{GD} + VCOMC_{LC}}{C_{LC} + C_{GD}} - V_S\right) * C_{LC} + (V_{REF} - V_{GL} - V_2) * C_{BG}$$

Therefore, the touch charge transfer $\Delta Q_{touch}$ from the first touch sensing phase to the second touch sensing phase will be:

$$\Delta Q_{touch} = V_{REF} * C_B + (V_{REF} - V_1) * C_{BS} + \left(\frac{V_{REF}C_{GD}}{C_{LC} + C_{GD}}\right) * C_{LC} + (V_{REF} - V_2) * C_{BG}$$

It can be found that when $V_1 > V_{REF}$, the charge transfer caused by the parasitic capacitance $C_{BS}$ is negative (it is assumed that charges flowing into the sensing pad is positive and charges flowing out of the sensing pad is negative), and the touch charge transfer $\Delta Q_{touch}$ will become smaller; similarly, when $V_2 > V_{REF}$, the charge transfer caused by the parasitic capacitance $C_{BG}$ is negative, and the touch charge transfer $\Delta Q_{touch}$ will also become smaller. Therefore, the touch charge transfer $\Delta Q_{touch}$ can be effectively reduced by adjusting $V_1$ and $V_2$ to enhance the charge transferring efficiency.

Then, please refer to FIG. 6 and FIG. 7A~FIG. 7D. FIG. 6 and FIG. 7A~FIG. 7D illustrate a schematic diagram of the simulated circuit and timing diagrams of the simulated results respectively.

Figure 6:
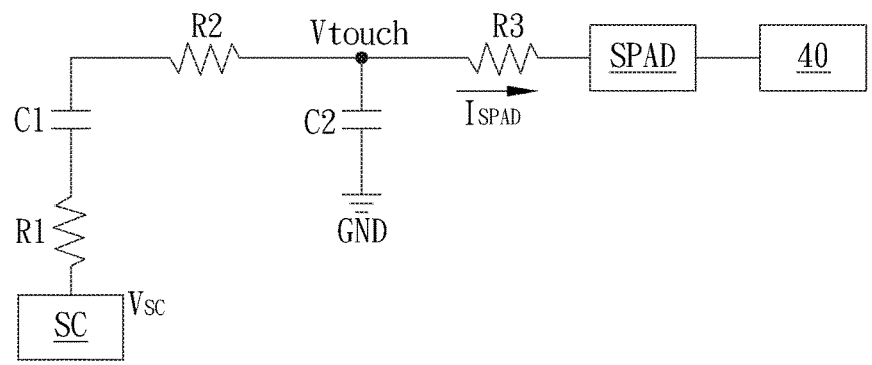
FIG. 6 and FIG. 7A-FIG. 7D illustrate a schematic diagram of the simulated circuit and timing diagrams of the simulated results respectively.

As shown in FIG. 6, it is assumed that the touch sensing circuit 40 is coupled to one terminal of the resistor R3 through the sensing pad SPAD, the capacitor C2 is coupled between another terminal of the resistor R3 and the ground terminal GND, and the resistor R2, the capacitor C1 and resistor R1 are coupled in order between the display driving source SC and another terminal of the resistor R3.

In this embodiment, the simulating conditions will be R1=3 kΩ, R2=1 kΩ, R3=50 kΩ, C1=400 pF and C2=200 pF, but not limited to this. When the driving voltage VSC of the display driving source SC is different, the variations of the touch sensing voltage $V_{Touch}$ and the sensing pad current ISPAD will be observed.

It should be notice that the touch sensing voltage $V_{Touch}$ is the voltage where the resistors R2, R3 and the capacitor C2 are coupled; the sensing pad current ISPAD is the current sensed by the sensing pad SPAD.

In this embodiment, as shown in FIG. 7, it is assumed that the sensing signal of the sensing pad SPAD is a periodic square wave voltage (wherein the periodic square wave voltage=ΔV). As shown in FIG. 7B, the driving voltage VSC of the display driving source SC can be set as the following four conditions:

the driving voltage VSC (1)=0 (1)

the driving voltage VSC (2)=the fixed voltage VF (2)

the driving voltage VSC (3)=the fixed voltage VF+the periodic square wave voltage ΔV (3)

the driving voltage VSC (4)=the fixed voltage VF+the periodic square wave voltage (ΔV+VA) (4)

Figure 7A:
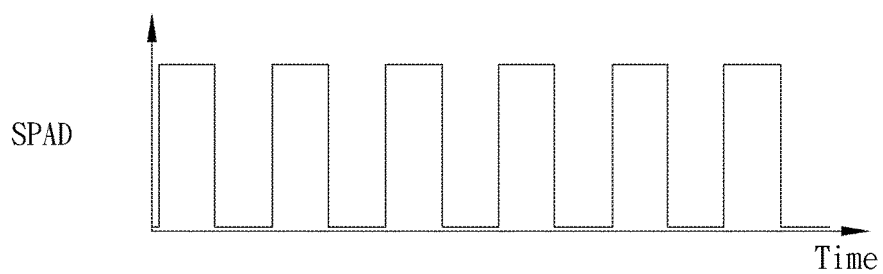
Figure 7B:
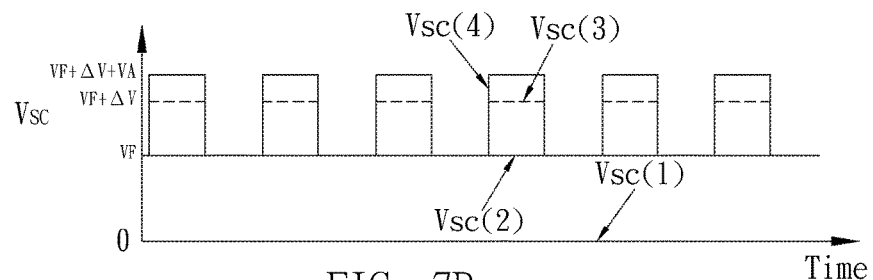
Figure 7C:
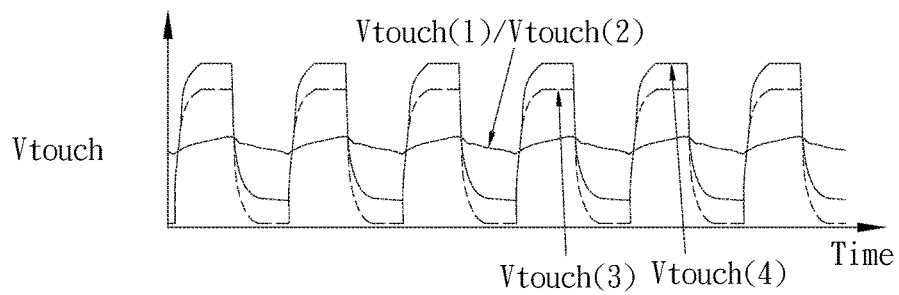

From the simulated result of the touch sensing voltage $V_{Touch}$ shown in FIG. 7C, it can be found that when the driving voltage VSC of the display driving source SC is increased from VSC (1)=0 to VSC (4)=the fixed voltage VF+the periodic square wave voltage (ΔV+VA), the demand of the touch sensing voltage $V_{Touch}$ (4) for time constant is obviously weaker than the demand of the touch sensing voltage $V_{Touch}$ (1) for time constant. Therefore, the touch sensing time of the touch sensing circuit 40 can be reduced and the display driving time of the display driving source SC can be increased relatively.

Figure 7D:
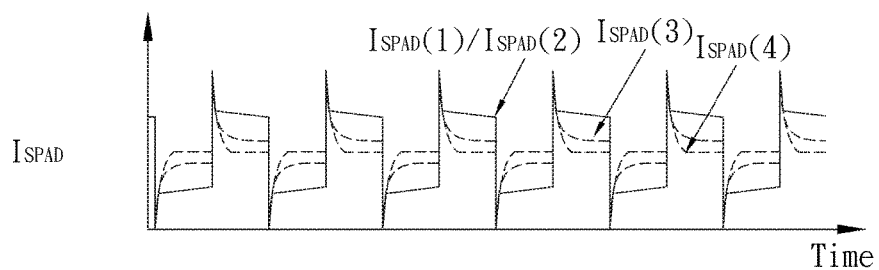

In addition, from the simulated result of the sensing pad current ISPAD shown in FIG. 7D, it can be found that when the driving voltage VSC of the display driving source SC is increased from VSC (1)=0 to VSC (4)=the fixed voltage VF+the periodic square wave voltage (ΔV+VA), the sensing pad current ISPAD (4) is obviously smaller than the sensing pad current ISPAD (1). Therefore, the charge amount transferred into the IC can be effectively reduced to relieve the demand of the IC for compensation capacitance.

Another embodiment of the invention is a self-capacitive touch display panel driving method for driving a self-capacitive touch display panel. In this embodiment, the self-capacitive touch display panel includes a resistor, a first capacitor, a second capacitor, a third capacitor, a common electrode, a display driving source and a touch sensing circuit. The first capacitor is coupled between a first terminal of the resistor and a ground terminal. The second capacitor and the third capacitor are coupled between the first terminal of the resistor and the ground terminal in series. The common electrode is coupled to a second terminal of the resistor. The display driving source is coupled between the second capacitor and the third capacitor. The touch sensing circuit is coupled to the common electrode.

During a touch sensing period, the touch sensing circuit senses a touch capacitance via the common electrode. It should be noticed that a first driving voltage of the display driving source is larger than a second driving voltage of the common electrode, so that the touch capacitance sensed by the touch sensing circuit is smaller than a capacitance of the first capacitor. As to the detail of the self-capacitive touch display panel driving method, please refer to the above-mentioned embodiments, they are not repeated here.

Compared to the prior art, the self-capacitive touch display panel and the self-capacitive touch display panel driving method of the invention provide a novel way to drive the in-cell self-capacitive touch display panel, so that the display driving and touch sensing of the in-cell self-capacitive touch display panel can be well cooperated to effectively reduce the touch sensing time and the sensed parasitic capacitance. The self-capacitive touch display panel and the self-capacitive touch display panel driving method of the invention have the following advantages:

(1) More panel capacitances can be loaded.
(2) The touch sensing time of the panel can be decreased.
(3) The display driving time of the panel can be increased.
(4) Better touch sensing performance can be achieved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A self-capacitive touch display panel, comprising:
   a resistor;
   a first capacitor, coupled between a first terminal of the resistor and a ground terminal;
   a second capacitor and a third capacitor coupled between the first terminal of the resistor and the ground terminal in series;
   a common electrode coupled to a second terminal of the resistor;
   a display driving source coupled between the second capacitor and the third capacitor; and
   a touch sensing circuit coupled to the common electrode, for sensing a touch capacitance via the common electrode during a touch sensing period;
   wherein a first driving voltage of the display driving source is larger than a second driving voltage of the common electrode, so that the touch capacitance sensed by the touch sensing circuit is smaller than a capacitance of the first capacitor, the first driving voltage of the display driving source forms a first current and the second driving voltage of the common electrode forms a second current, the first current and the second current both flow through the first capacitor, so that a parasitic capacitance sensed by the touch sensing circuit is decreased and the touch capacitance sensed by the touch sensing circuit is smaller than the capacitance of the first capacitor.

2. The self-capacitive touch display panel of claim 1, wherein the first current flows to the first capacitor and the second current flows to the first capacitor through the resistor.

3. The self-capacitive touch display panel of claim 1, wherein the common electrode senses the touch capacitance through a sensing pad.

4. The self-capacitive touch display panel of claim 1, wherein the self-capacitive touch display panel is an in-cell self-capacitive touch display panel or a hybrid self-capacitive touch display panel.

5. The self-capacitive touch display panel of claim 1, further comprising:
   a display driving gate coupled to the display driving source, wherein a third driving voltage of the display driving gate is larger than the second driving voltage of the common electrode.

6. The self-capacitive touch display panel of claim 1, further comprising:
   a touch and display integrated chip coupled to the common electrode.

7. The self-capacitive touch display panel of claim 1, wherein a touch sensing time that the touch sensing circuit performs touch sensing is decreased, so that a display driving time of the display driving source becomes longer.

8. A self-capacitive touch display panel driving method for driving a self-capacitive touch display panel, the self-capacitive touch display panel comprising a resistor, a first capacitor, a second capacitor, a third capacitor, a common electrode, a display driving source and a touch sensing circuit, the first capacitor being coupled between a first terminal of the resistor and a ground terminal, the second capacitor and the third capacitor being coupled between the first terminal of the resistor and the ground terminal in series, the common electrode being coupled to a second terminal of the resistor, the display driving source being coupled between the second capacitor and the third capacitor, the touch sensing circuit being coupled to the common electrode, the self-capacitive touch display panel driving method comprising:
   during a touch sensing period, the touch sensing circuit sensing a touch capacitance via the common electrode;
   wherein a first driving voltage of the display driving source is larger than a second driving voltage of the common electrode, so that the touch capacitance sensed by the touch sensing circuit is smaller than a capacitance of the first capacitor, the first driving voltage of the display driving source forms a first current and the second driving voltage of the common electrode forms a second current, the first current and the second current both flow through the first capacitor, so that a parasitic capacitance sensed by the touch sensing circuit is decreased and the touch capacitance sensed by the touch sensing circuit is smaller than the capacitance of the first capacitor.

9. A self-capacitive touch display panel, comprising:
   a resistor;
   a first capacitor, coupled between a first terminal of the resistor and a ground terminal;
   a second capacitor and a third capacitor coupled between the first terminal of the resistor and the ground terminal in series;
   a common electrode coupled to a second terminal of the resistor;
   a display driving source coupled between the second capacitor and the third capacitor;
   a display driving gate coupled to the display driving source; and
   a touch sensing circuit coupled to the common electrode, for sensing a touch capacitance via the common electrode during a touch sensing period;
   wherein a first driving voltage of the display driving source is larger than a second driving voltage of the common electrode, so that the touch capacitance sensed by the touch sensing circuit is smaller than a capacitance of the first capacitor, a third driving voltage of the display driving gate is larger than the second driving voltage of the common electrode.

10. A self-capacitive touch display panel driving method for driving a self-capacitive touch display panel, the self-capacitive touch display panel comprising a resistor, a first capacitor, a second capacitor, a third capacitor, a common electrode, a display driving source, a display driving gate and a touch sensing circuit, the first capacitor being coupled between a first terminal of the resistor and a ground terminal, the second capacitor and the third capacitor being coupled between the first terminal of the resistor and the ground terminal in series, the common electrode being coupled to a second terminal of the resistor, the display driving source being coupled between the second capacitor and the third capacitor, the display driving gate being coupled to the display driving source, the touch sensing circuit being coupled to the common electrode, the self-capacitive touch display panel driving method comprising:

during a touch sensing period, the touch sensing circuit sensing a touch capacitance via the common electrode;

wherein a first driving voltage of the display driving source is larger than a second driving voltage of the common electrode, so that the touch capacitance sensed by the touch sensing circuit is smaller than a capacitance of the first capacitor, a third driving voltage of the display driving gate is larger than the second driving voltage of the common electrode.

\* \* \* \* \*